United States Patent [19]
Borho et al.

[11] Patent Number: 5,071,950
[45] Date of Patent: Dec. 10, 1991

[54] LOW PRESSURE COPOLYMERIZATION OF ETHYLENE WITH ALPHA-OLEFINS AND ETHYLENE COPOLYMERS HAVING A LOW RESIDUAL MONOMER CONTENT

[75] Inventors: Klaus Borho, Mutterstadt; Horst Bullack, Wesseling; Alfred F. Hauss, Ludwigshafen; Peter Hennenberger, Freinsheim; Klaus Hilligardt; Benno Knauer, both of Ludwigshafen; Farid Rizk, Neuhofen; Heinz Vogt, Ludwigshafen, all of Fed. Rep. of Germany

[73] Assignee: BASF Aktiengesellschaft, Ludwigshafen, Fed. Rep. of Germany

[21] Appl. No.: 587,563

[22] Filed: Sep. 24, 1990

Related U.S. Application Data

[63] Continuation of Ser. No. 346,896, May 3, 1989, abandoned.

[30] Foreign Application Priority Data

May 6, 1988 [DE] Fed. Rep. of Germany ....... 3815487

[51] Int. Cl.$^5$ .............................................. C08F 6/00
[52] U.S. Cl. .................................. 528/483; 528/499; 528/500; 528/501; 526/68
[58] Field of Search ............... 528/483, 499, 500, 501; 526/68

[56] References Cited

U.S. PATENT DOCUMENTS

| | | | |
|---|---|---|---|
| 3,152,872 | 10/1964 | Scoggin et al. | 528/501 X |
| 3,488,339 | 1/1970 | Carter | 528/483 X |
| 4,258,158 | 3/1981 | Pfeiffer | 526/68 |
| 4,372,758 | 2/1983 | Bobst et al. | 528/483 X |
| 4,758,654 | 7/1988 | Brod et al. | 528/499 X |

FOREIGN PATENT DOCUMENTS

| | | | |
|---|---|---|---|
| 0047077 | 3/1982 | European Pat. Off. | 528/483 |
| 0068146 | 1/1983 | European Pat. Off. | |
| 0127253 | 1/1988 | European Pat. Off. | |

Primary Examiner—Fred Teskin
Attorney, Agent, or Firm—Keil & Weinkauf

[57] ABSTRACT

Ethylene/α-olefin copolymers are prepared by catalytic dry-phase copolymerization of the monomers in a stirred or fluidized polymerization zone, transfer of the resulting mixture of solid copolymer and unconverted gaseous monomer into a let-down zone and separation of the mixture, after pressure reduction, into a gaseous phase and a solid phase, by a continuous process in which the solid phase is continuously flushed beforehand with gaseous ethylene and then flushed with a mixture of nitrogen and steam. The ethylene copolymers are very substantially free of residual monomers and odor and flavor substances.

5 Claims, 1 Drawing Sheet

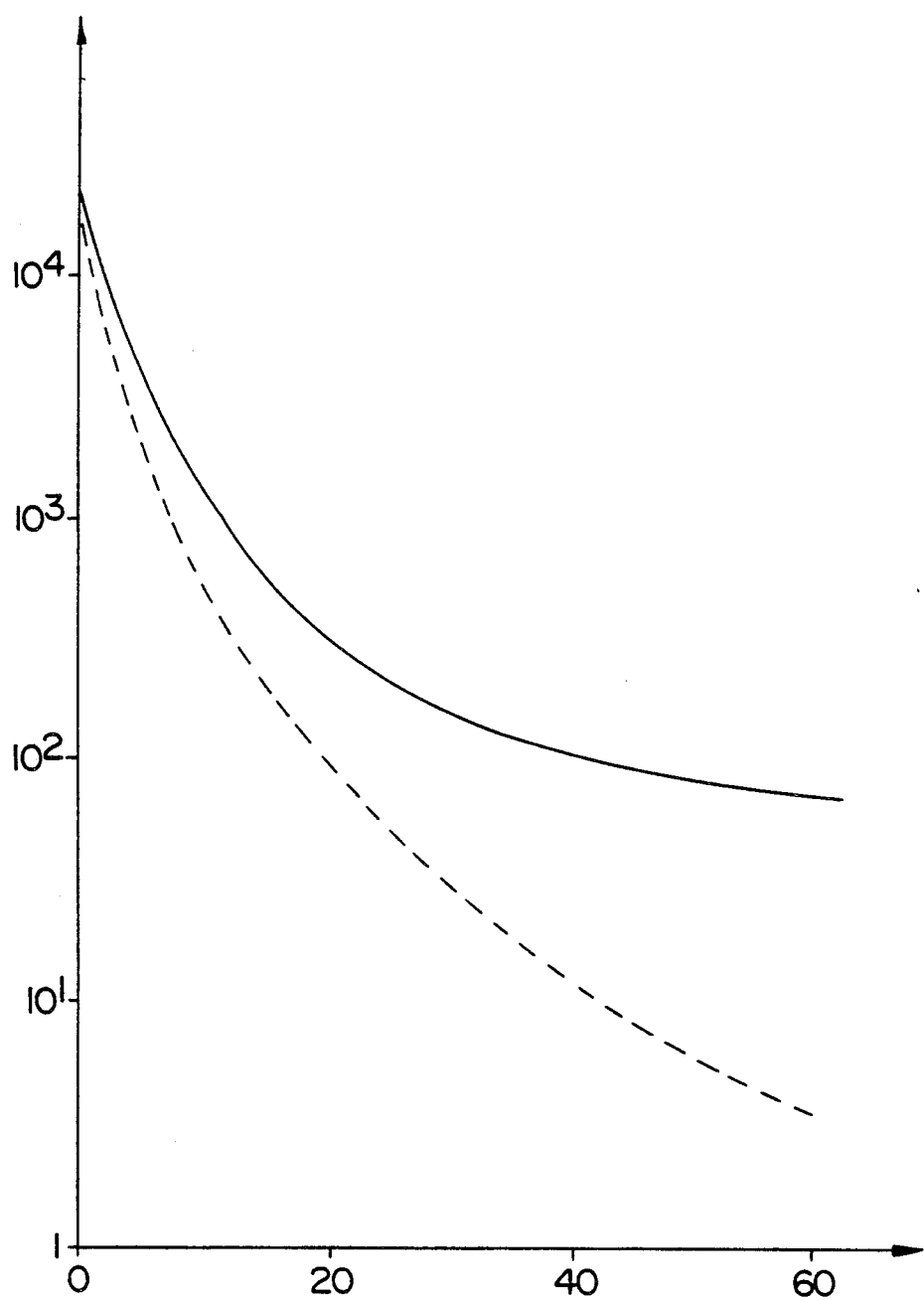

LOW PRESSURE COPOLYMERIZATION OF ETHYLENE WITH ALPHA-OLEFINS AND ETHYLENE COPOLYMERS HAVING A LOW RESIDUAL MONOMER CONTENT

This application is a continuation of application Ser. No. 346,896, filed on May 3, 1989, now abandoned.

The present invention relates to a process for the continuous preparation of ethylene/α-olefin copolymers by catalytic dry-phase copolymerization of the monomers under from 10 to 60 bar and at from 40° to 120° C. in a stirred or fluidized polymerization zone, transfer of the resulting mixture of solid copolymer and unconverted gaseous monomers into a let-down zone, separation of the mixture, after pressure reduction, into a gaseous phase (I) and a solid phase (II) and recycling of the monomers. The present invention furthermore relates to ethylene copolymers having a low residual monomer content.

Processes of this type give low pressure olefin copolymers which are substantially free of monomers dissolved in the copolymer and which have little intrinsic odor.

For ecological, economic and safety reasons, it is absolutely essential to remove the nonpolymerized monomers from the polymers, since the monomers pollute the environment, may for explosive mixtures in the presence of atmospheric oxygen, reduce the product quality through their intrinsic odor and would make the end products substantially more expensive if these starting materials were not recovered.

The purification of the olefin polymers to remove adhering monomers, odorous substances or suspending agents or solvents has long been known. For example, an inert gas stream of carbon dioxide or nitrogen can be used to remove the volatile hydrocarbons (cf. U.S. Pat. No. 3,152,872), the end product can be washed with liquid olefin (cf. U.S. Pat. No. 4,214,063) or devolatilization of the polyolefin powder can be carried out using saturated aliphatic hydrocarbons (cf. Chemical Abstracts 103, 1985, 54 599 r). These known processes have the disadvantage that the residual monomers, or residual monomers and the suspending agent, can be removed only to a limited extent, and the processes involved are complicated and expensive.

U.S. Pat. No. 4,258,158 describes a process for separating off nonpolymerized gaseous monomers together with alkanehydrocarbons, in which the polymer is treated with an inert gas stream by the counter-current method. By compressing and cooling the resulting inert gas/hydrocarbon mixture, the hydrocarbons are condensed and subjected to fractional distillation in further expensive process steps, before being recycled to the reaction space.

GB-A-1 272 778 discloses a process for the devolatilization of polyethylene grit with an inert gas, without recovery of the nonpolymerized monomers. This process pollutes the environment as a result of the hydrocarbon emission and makes the products more expensive owing to the lack of recovery of the monomers adhering to the polymer.

U.S. Pat. No. 4,372,758 describes a process for the devolatilization of polyethylene grit with an inert gas, without recovery of the expelled monomers.

European Patent Application 88117212.6 proposes a process for removing suspending agents and unconverted monomers, in which the residual amounts, after passage through a let-down zone, are removed in a drying zone by passing in a stream of inert gas. A process of this type for simultaneous removal of relatively large amounts of suspending agents is not necessary in the case of olefin polymers which have been prepared by dry-phase polymerization.

Finally, EP-B1-0 127 253 discloses a process for removing residual monomers from solid ethylene copolymers, in which the solid copolymer is subjected to reduced pressure and then treated with reactor gas or a component of the reactor gas, which is essentially free of inert gases. This process too is unsuitable for virtually completely eliminating the residual monomer content of the copolymer.

It is an object of the present invention to provide a catalytic dry-phase polymerization process of the type defined at the outset, in which the solid phase (II) is worked up economically and in an environmentally compatible manner so that the unconverted monomers adhering to the copolymer are obtained in a form which can be reused directly for the process itself, with simultaneous elimination of the residual odor and flavor substances still adhering to the copolymer.

It is a further object of the present invention to provide an ethylene copolymer which is very substantially free of residual monomers and odor and flavor substances.

We have found that these objects are achieved by processes of the type defined at the outset, wherein the solid phase (II) is continuously flushed beforehand with gaseous ethylene and then flushed with a mixture of nitrogen and steam.

The gas phase (III) formed during preliminary flushing of the solid phase (II) is preferably recycled together with the gas phase (I) to the polymerization system.

Furthermore, the preliminary flushing of the solid phase (II) is preferably carried out at the temperature prevailing in the polymerization system and under from 0.1 to 3 bar gage pressure.

Another preferred process is one in which the solid phase (II) is subsequently flushed with steam-enriched nitrogen under from 0.05 to 3 bar gage pressure and at from 40° to 120° C.

The solid phase (II) is particularly preferably flushed with the flushing gases in each case by the counter-current method.

We have found that this object is furthermore achieved by ethylene copolymers which are very substantially free of residual monomers and odor and flavor substances and which have been prepared by one of the above processes.

Processes of the type defined at the outset are sufficiently well known to make a detailed description unnecessary (cf. for example Ullmanns Encyklopädie der technischen Chemie, 4th Edition, 1980, Volume 19, pages 178–186, or Encyclopedia of Polymer Science and Engineering, 2nd Edition, 1986, Volume 6, pages 436–438).

The substances to be used in the process are the relevant conventional ones. This applies to the monomers, in particular ethylene, propylene, but-1-ene, hex1-ene, 4-methylpent-1-ene or oct-1-ene. It also applies to the catalysts, which, as a rule, are of the Phillips type or, in particular, of the Ziegler type in combination with organometallic aluminum compounds. The same also applies to the steam/nitrogen mixture used for subsequent flushing of the solid phase. The content of the comonomers copolymerized in the ethylene copolymer is in general from 1 to 20% by weight.

The apparatuses required for the process, such as polymerization reactors, feed and discharge elements, valves for pressure reduction (let-down valves), let-down and flushing containers, pumps and compressors for increasing pressure and for conveying, condensers and driers, once again have no special features and form part of the well known prior art.

In general, it may be said that, apart from that part of the process which is according to the invention, the process has not only been described for many years in the literature but also carried out in practice in industry, so that further explanation of the process is to this extent unnecessary.

Separation of the mixture of solid copolymer and unconverted gaseous monomers is carried out by continuously discharging the mixture into a let-down zone which is under from 0.1 to 3 bar gage pressure and at from 40 to 120° C., so that a gaseous phase (I), which essentially consists of monomers, and a solid phase (II), which essentially consists of copolymer and from 0.1 to 8% by weight, based on the weight of the copolymer, of adhering monomers, can form. It is usual for the monomers separated off from the polymer to be recycled to the polymerization zone.

In addition, reference may also be made to the patent literature cited at the outset and to EP-A-0 174 620 in this context.

In the novel process, the solid phase (II) should be continuously flushed beforehand with gaseous ethylene and then flushed with a mixture of nitrogen and steam.

A preferred process is one in which the gas phase (III) formed during preliminary flushing of the solid phase (II) is recycled together with the gas phase (I) to the polymerization system.

In another preferred process, preliminary flushing of the solid phase (II) is carried out at the temperature prevailing in the polymerization system and under from 0.1 to 3 bar gage pressure.

A process in which the solid phase (II) is subsequently flushed with steam-enriched nitrogen under from 0.05 to 3 bar gage pressure and at from 40° to 120° C. is also preferred.

In the novel process, it is advantageous if the solid phase (HI) is flushed with the flushing gases in each case by the counter-current method.

Regarding the novel part of the process, the following may be stated specifically:

From the polymerization system, a mixture of copolymer and monomers is introduced quasi-continuously into a shaft apparatus and flushed continuously with the ethylene required as a starting material in the process, preferably by the counter-current method. The resulting gaseous phases can be fed to the polymerization system without further measures, such as separation and purification of the components. This makes it possible for more than 95% by weight of the monomers adhering to the copolymer to be recovered in a simple and economical procedure.

We have found that, as a rule, it is advantageous to adopt a procedure in which the copolymer is kept at the temperature prevailing in the polymerization system. The flow rate of the ethylene used for flushing is preferably from 0.01 to 0.1, in particular 0.05, m/s, based on the free cross-section of the shaft apparatus. The mean residence time of the copolymer in the shaft apparatus is preferably from 10 to 30, in particular 20, min. The flushing gas requirement is only from 0.9 to 9, preferably 5%, by volume, based on the polymer volume.

The copolymer treated with ethylene is then flushed continuously with a mixture of steam and nitrogen, preferably by the countercurrent method, in a further shaft apparatus.

As a rule, it is advantageous to adopt a procedure in which the copolymer is still maintained at the temperature prevailing in the reaction space. The flow rate of the steam-enriched nitrogen is preferably from 0.01 to 0.05, in particular 0.02, m/s, based on the cross-section of the shaft apparatus. The temperature of the steam/nitrogen mixture should be chosen so that, under the pressures prevailing in the shaft apparatus, the steam does not condense in the said apparatus.

The mean residence time of the copolymer in the shaft apparatus may be varied from half an hour to several hours without adversely affecting the copolymer.

By combining the two process steps, preliminary flushing of the copolymer with ethylene and subsequent flushing with a mixture of steam and nitrogen, the copolymer obtained in catalytic dry-phase copolymerization can be freed from the adhering monomers as well as from further odor substances in a simple and rapid procedure.

An advantage of the novel procedure over the prior art is that the efficient devolatilization is carried out in very short copolymer residence times. The novel process is particularly suitable for the preparation of low density copolymers of ethylene, since increasing molecular weight of the comonomers is accompanied by an increase in their solubility in the copolymer and in the intensity of their odor.

The drawing illustrates the advantage of the novel process. In the devolatilization of an ethylene/hexene copolymer at 75° C., the residual monomer content in the copolymer, measured in ppm, is plotted along the ordinate and the total devolatilization time, measured in minutes, is plotted along the abscissa, the solid line representing the devolatilization with nitrogen or ethylene according to the prior art, and the dashed line representing the novel devolatilization with ethylene and then with a steam/nitrogen mixture.

The simple recovery of the monomers in an amount of more than 95% by weight demonstrates the particular economic advantage of the novel process.

EXAMPLE

The copolymerization is carried out continuously in a cylindrical fluidized bed reactor which has a diameter of 50 cm and, during the copolymerization in the continuous steady state, contains 160 kg of a finely divided copolymer as a polymerization medium.

Specifically, the copolymerization process is such that
 a) the polymerization medium is a fluidized bed of finely divided copolymer, with the provisos that
 $a_1$) fluidization of the polymerization medium is effected by means of a gas stream which is directed upward and has a velocity of 70 cm/s;
 $a_2$) in the polymerization medium, the heat of polymerization is essentially removed by the gas stream required to maintain the fluidized bed;
 b) the monomers consumed by copolymerization and the hydrogen used for regulating the molecular weight of the copolymer are continuously replenished;

c) the chosen conditions, such as pressure, temperature and gas composition, are kept constant, and d) the copolymerization is carried out under a gas pressure of 20 bar at 85° C. and with an $H_2$/ethylene weight ratio of 0.17:1 and a hex-1-ene/ethylene weight ratio of 0.19:1.

Under these conditions, ethylene is copolymerized with hex-1-ene by intermittent addition of 6.7 g/hour of a catalyst component (1) described in EP-A 0 174 620 and 5.8 g/hour of triisobutylaluminum.

The copolymer is isolated by 1. discharging a mixture of essentially copolymer, ethylene, hex-1-ene and $N_2$ (about 46 kg of mixture, composed of about 35 kg of ethylene copolymer, about 2.2 kg of hex-1-ene and about 3.8 kg of ethylene, per hour) from the polymerization space and 2. bringing the mixture to 0.5 bar gage pressure and 85° C., with formation of a gaseous phase (I), essentially consisting of ethylene, hex-1-ene and $N_2$, and a solid phase (II), essentially consisting of the copolymer with about 2.5% by weight, based on the weight of the copolymer, of adhering hex-1 -ene.

In a typical procedure, the novel process is continued by additionally flushing the solid phase (II) continuously beforehand with ethylene preheated to 85° C., with reduction of the amount of hex-1-ene adhering to the copolymer and recycling of the resulting gaseous phase (III), essentially consisting of ethylene and hex-1-ene, together with the gaseous phase (I) to the polymerization space.

The solid phase consisting of (II) is then brought to 0.05 bar gage pressure and to 85° C. and is subsequently flushed with nitrogen enriched at 85° C. and under 0.1 bar gage pressure with steam. The flow rate of the steam/nitrogen mixture is 0.02 m/s, based on the free cross-section of the shaft apparatus.

The residence time of the product is about 40 minutes.

The total devolatilization time is accordingly 60 minutes.

After the novel procedure, only about 8 ppm of hex-1-ene are still measured in the copolymer. The Nikolaus value is 2.

COMPARATIVE EXAMPLE

The procedure described in the above Example is followed, with the sole exception that the resulting solid phase consisting of (II) is flushed only with $N_2$ under 0.05 bar gage pressure and at 75° C. for 60 minutes. The flow rate of the $N_2$ is 0.05 m/s, based on the free cross-section of the shaft apparatus.

About 90 ppm of hex-1-ene are still measured in the copolymer. The Nikolaus value (the Nikolaus value is a measure of the intensity of the odor of the copolymer, the lowest values indicating the lowest intensity of odor) is 3.5.

We claim:

1. A process for the continuous preparation of an ethylene/α-olefin copolymer which comprises: copolymerizing by catalytic dry-phase copolymerization the ethylene and α-olefin monomers at a pressure of 10 to 60 bar and a temperature of 40° C. to 120° C. in a stirred or fluidized polymerization zone, transferring the resulting mixture of solid copolymer and unconverted gaseous monomers into a let-down zone, reducing the pressure in the let-down zone and separating the mixture into a gas phase (I) and a solid phase (II), and, recycling the monomers of gas phase (I) to the polymerization zone, wherein the solid phase (II) is continuously preliminary flushed with gaseous ethylene to form a gas phase (III) and subsequently flushed with a mixture of nitrogen and steam.

2. The process of claim 1, wherein the gas phase (III) formed during preliminary flushing of the solid phase (II) is recycled together with the gas phase (I) to the polymerization zone.

3. The process of claim 1, wherein preliminary flushing of the solid phase (II) is carried out at the temperature prevailing in the polymerization system and under from 0.1 to 3 bar gage pressure.

4. The process of claim 1, wherein the solid phase (II) is subsequently flushed with steam-enriched nitrogen under from 0.05 to 3 bar gage pressure and at from 40° to 120° C.

5. The process of claim 1, wherein the solid phase (II) is flushed with the flushing gases in each case by the counter-current method.

* * * * *